Figure 3:
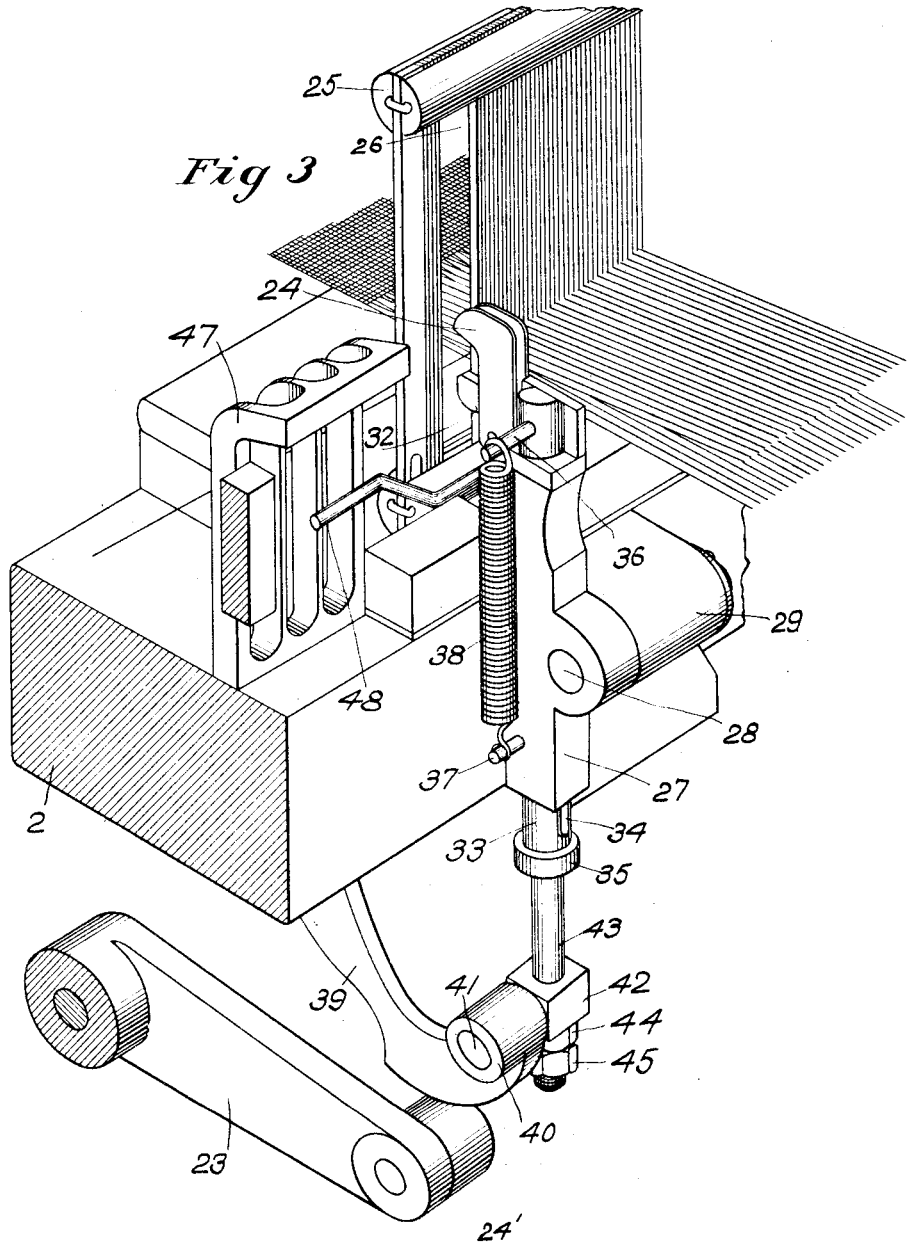

F. A. MILLS.
THREAD PARTING MECHANISM FOR FILLING REPLENISHING LOOMS.
APPLICATION FILED JULY 31, 1906.
1,119,187.
Patented Dec. 1, 1914.
6 SHEETS—SHEET 1.
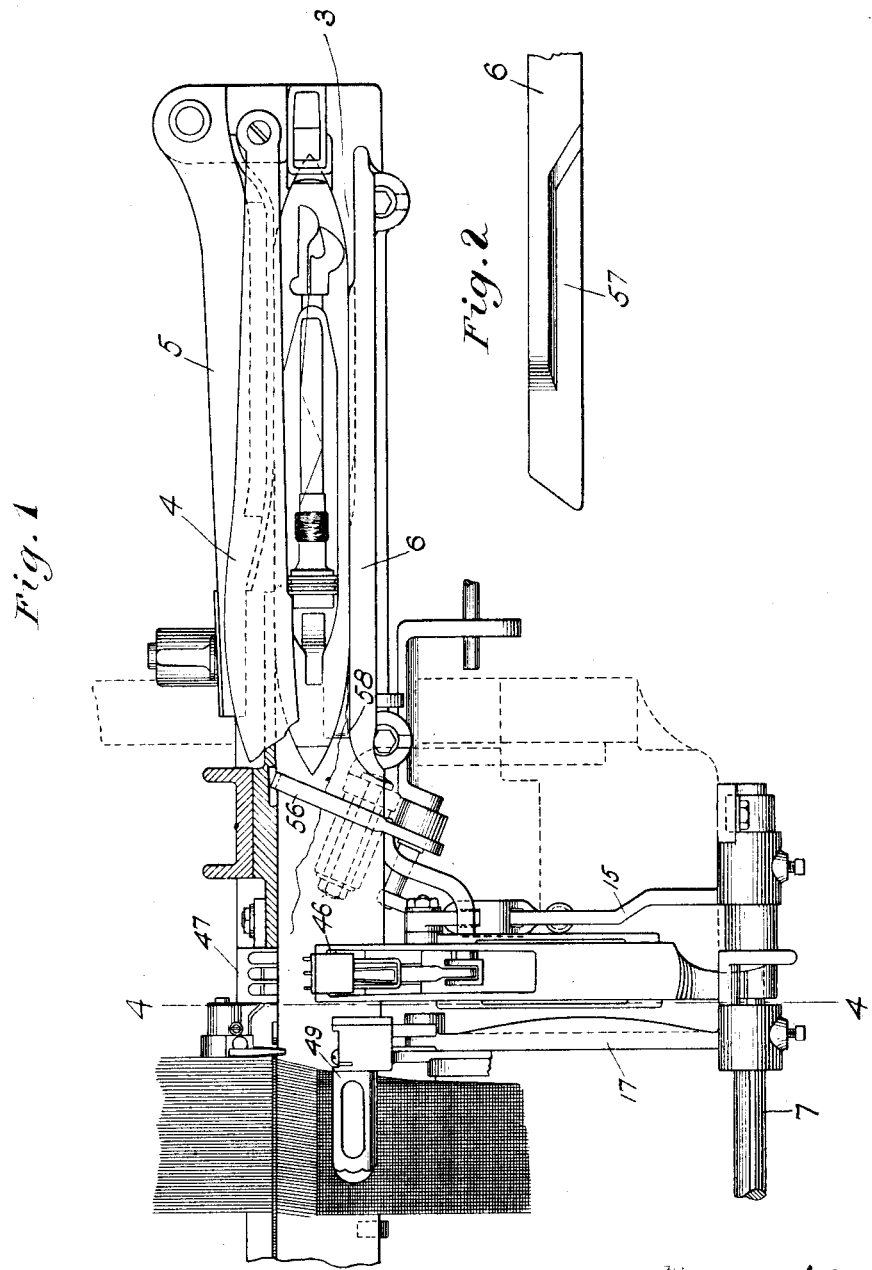

F. A. MILLS.
THREAD PARTING MECHANISM FOR FILLING REPLENISHING LOOMS.
APPLICATION FILED JULY 31, 1906.

1,119,187.

Patented Dec. 1, 1914.
6 SHEETS—SHEET 2.

Witnesses:
Irving U. Townsend.
Jesse A. Holton

Inventor:
Francis A. Mills
by Emery and Booth,
Atty's

F. A. MILLS.
THREAD PARTING MECHANISM FOR FILLING REPLENISHING LOOMS.
APPLICATION FILED JULY 31, 1906.

1,119,187. Patented Dec. 1, 1914.

Witnesses:
Irving V. Townsend.
Jesse A. Holton.

Inventor:
Francis A. Mills.
Emery and Booth
Atty's

F. A. MILLS.
THREAD PARTING MECHANISM FOR FILLING REPLENISHING LOOMS.
APPLICATION FILED JULY 31, 1906.
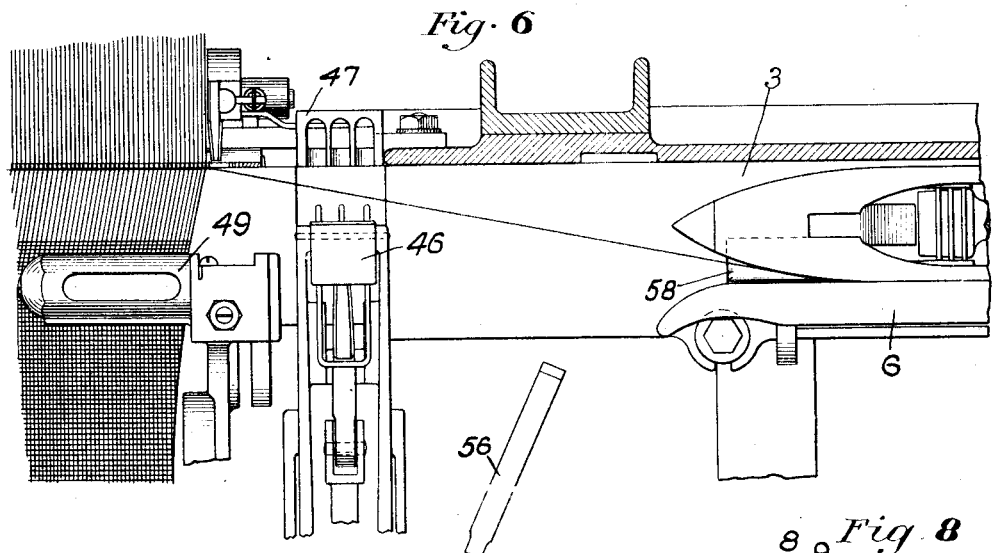
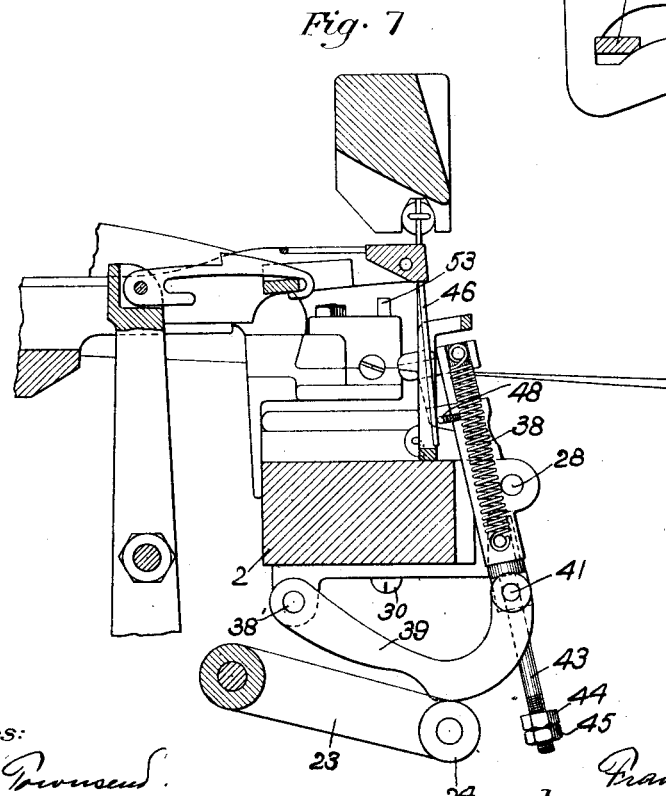

F. A. MILLS.
THREAD PARTING MECHANISM FOR FILLING REPLENISHING LOOMS.
APPLICATION FILED JULY 31, 1906.

1,119,187.

Patented Dec. 1, 1914.
6 SHEETS—SHEET 5.

Witnesses:
Irving U. Townsend.
Jesse A. Holton.

Inventor.
Francis A. Mills
by Emery and Booth
Atty's

F. A. MILLS.
THREAD PARTING MECHANISM FOR FILLING REPLENISHING LOOMS.
APPLICATION FILED JULY 31, 1906.
1,119,187.
Patented Dec. 1, 1914.
6 SHEETS—SHEET 6.
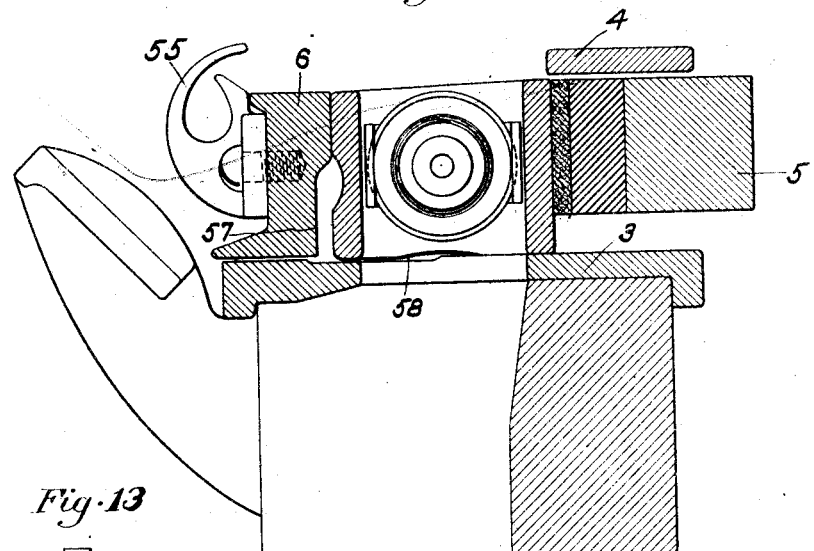
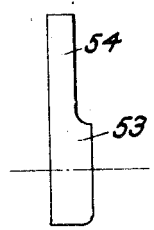
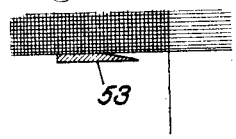
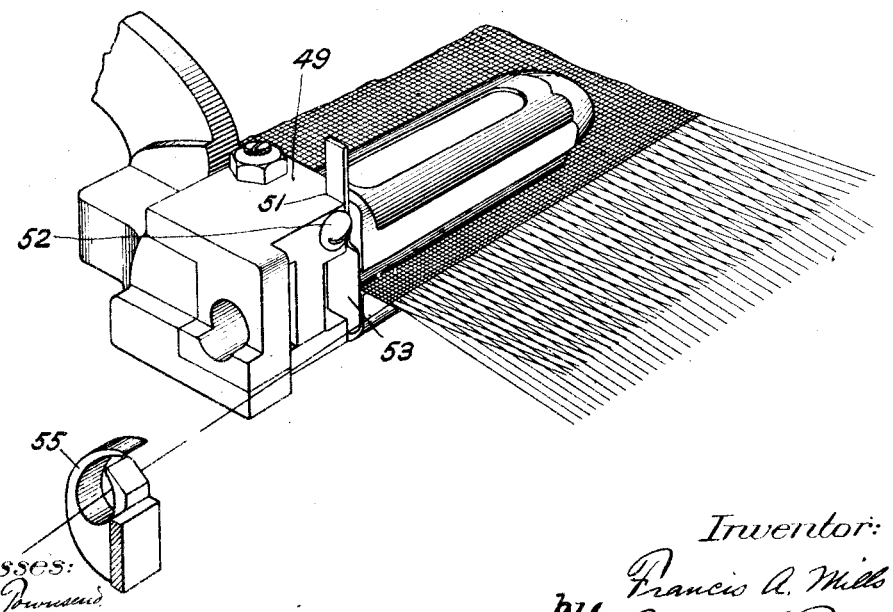
Witnesses:
Irving U. Townsend
Jesse A. Holton
Inventor:
Francis A. Mills
by Emery and Booth
Atty's

UNITED STATES PATENT OFFICE.

FRANCIS ARTHUR MILLS, OF LAWRENCE, MASSACHUSETTS, ASSIGNOR TO DRAPER COMPANY, OF HOPEDALE, MASSACHUSETTS, A CORPORATION OF MAINE.

THREAD-PARTING MECHANISM FOR FILLING-REPLENISHING LOOMS.

1,119,187.   Specification of Letters Patent.   Patented Dec. 1, 1914.

Application filed July 31, 1906. Serial No. 328,549.

*To all whom it may concern:*

Be it known that I, FRANCIS A. MILLS, a citizen of the United States, residing at Lawrence, in the county of Essex and State of Massachusetts, have invented an Improvement in Thread-Parting Mechanism for Filling-Replenishing Looms, of which the following description, in connection with the accompanying drawings, is a specification, like letters on the drawings representing like parts.

This invention relates primarily to filling replenishing looms.

I have chosen to represent my improvements applied to a filling replenishing loom of the type wherein the bobbin is replenished upon substantial exhaustion of filling in the running shuttle, but I wish it to be clearly understood that I may employ a filling replenishing mechanism wherein a fresh shuttle, having a supply of filling therein, is substituted for the running shuttle either upon substantial exhaustion or upon filling failure, or that I may employ weft carriers or cases within a shuttle, a weft carrier or case being ejected from the running shuttle and another substituted therefor upon substantial exhaustion of the filling or upon complete failure thereof. I may, if preferred, employ a bobbin replenishing loom wherein the replenishing mechanism is operative upon the entire absence of filling, instead of upon substantial exhaustion thereof. Inasmuch as these several types of filling replenishing mechanism are well-known it is unnecessary for me to illustrate more than the one type shown which presents one practical embodiment of my invention.

My invention particularly relates to means for severing the filling in replenishing looms.

Cutters or severing devices have heretofore been employed in filling replenishing looms to sever the old and the new filling upon replenishment but the same have generally proved unsatisfactory either because of uncertainty in action or because the filling has been severed at such a distance from the selvage that either a retrimming of the goods is required or the projecting ends of the severed filling are in the further operation of the loom carried into the cloth, forming slugs or unsightly portions.

In order that the principles of my invention may be clearly understood I have selected for description one type or embodiment thereof, the same being illustrated in the accompanying drawings, wherein;—

Figure 4:
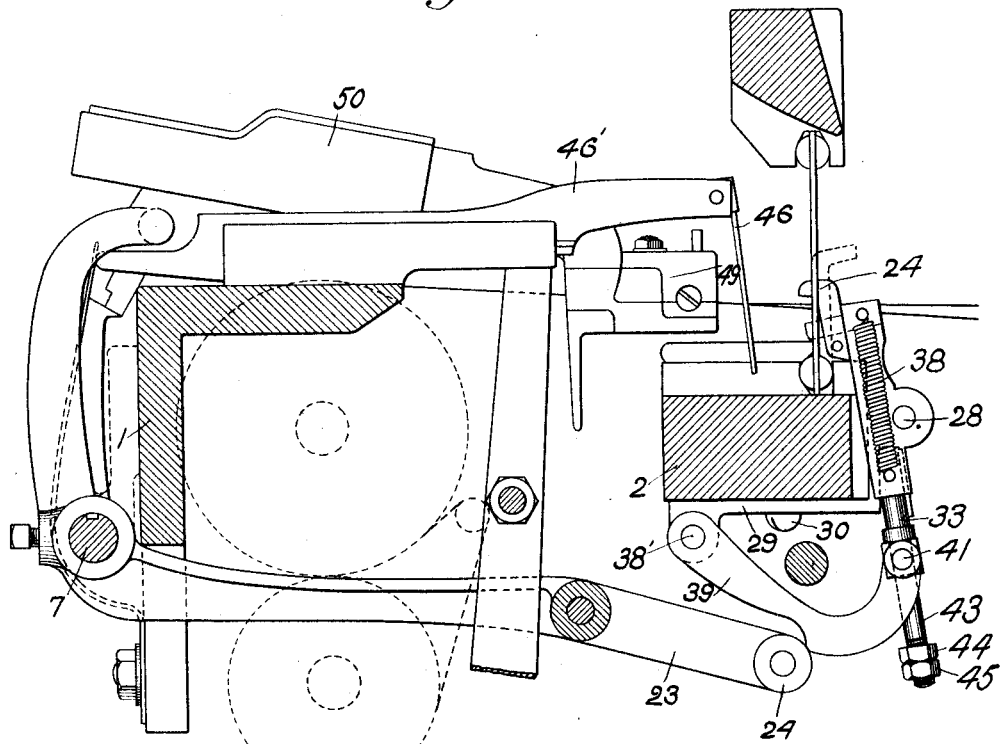
Figure 5:
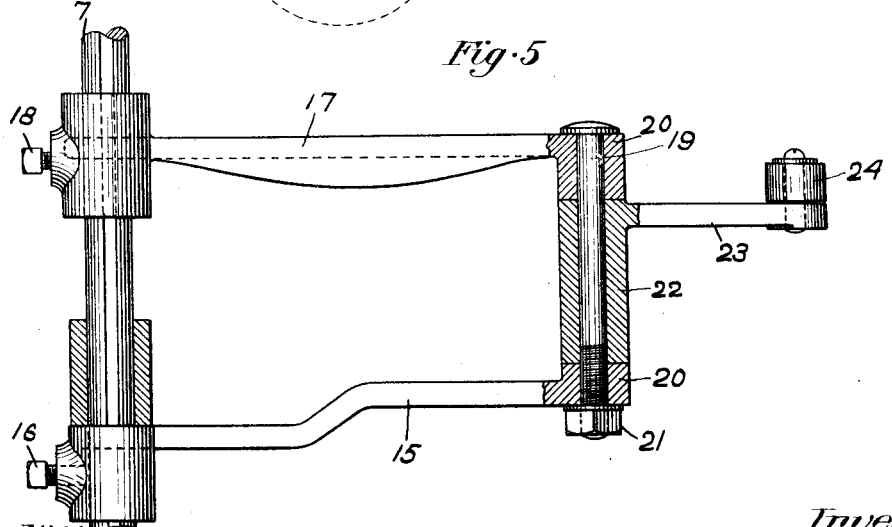
Figure 9:
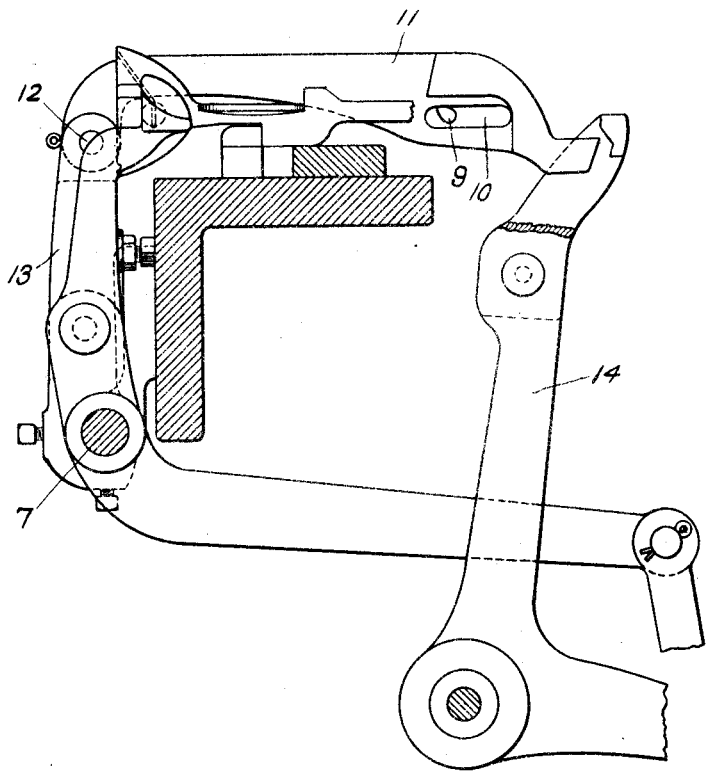
Figure 10:
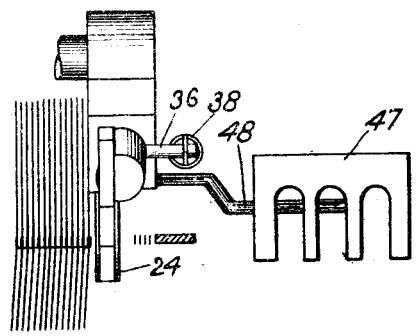

Figure 1 is a plan view, partly in section, of the replenishment side of a loom, the indication for replenishment having occurred, and the shuttle having traveled to the replenishing side so that the bobbin is in position for ejection and the filling thereof has been severed; Fig. 2 is a bottom plan view of a portion of the front shuttle box wall upon the replenishment side of the loom, showing the same as recessed or cut away to prevent the binding of the filling upon the ejection of the filling carrier; Fig. 3 is a cross or vertical section through the lay of the loom near the replenishing end thereof, showing the cutter for the old filling in its normal or inoperative position, many of the parts being shown in elevation; Fig. 4 is a vertical section through the loom upon the line 4—4 of Fig. 1, and showing the cutter for the old filling as projected into cutting position; Fig. 5 is a detail, partly in plan and partly in horizontal section, showing a portion of the transfer shaft of the replenishing mechanism and the old filling cutter operating means connected therewith; Fig. 6 is a plan view of the replenishment side of the loom, showing the parts in running position and the shuttle as boxed on that side of the loom; Fig. 7 is a vertical section through the loom from front to rear, showing the cutter for the old filling as having severed the same and showing also the means for tilting the auxiliary weft detector upon the forward movement of the lay whereon the old filling is severed; Fig. 8 is a detail showing a portion of the operating means for the lever that upon indication of substantial exhaustion of the filling is moved to bring the allied parts into operative relation to the weft hammer, thereby to cause replenishment in any preferred manner; Fig. 9 is a vertical sectional view through the breast beam of the loom, showing in elevation the means for operating the replenishing mechanism and representing the indication for replenishment as having just occurred; Fig. 10 is a detail representing the old filling as having just been severed; Fig. 11 is a vertical section through the shuttle box on the replenishment side of the loom, the shuttle being positioned thereon, and showing the recessed front side and bottom of the said box; Fig. 12 is a plan view of the temple upon the replenishment side of the loom, showing the cutter for the new filling mounted therein; Fig. 13 is a side elevation of the cutter for the new filling, and Fig. 14 is a horizontal section through the said cutter, showing a proper location of the same with respect to the selvage of the fabric.

Having reference to that type or embodiment of my invention which is here selected for illustration, the breast beam of the loom (Figs. 4 and 9) is represented at 1, and the lay thereof at 2. Mounted as usual upon the opposite ends of the lay, and, viewing Figs. 1 and 6 wherein only one end of the lay is shown, the plate or bottom of the shuttle box is represented at 3, the shuttle guard at 4, the binder at 5 and the front wall of the shuttle box at 6. These parts, except as will be hereinafter described, are of any usual or preferred type.

I have not herein represented in detail the replenishing mechanism, nor have I shown in detail the mechanism for indicating replenishment. The former may, as previously stated, be of any preferred type. Viewing Fig. 6, the side of the loom there indicated I herein designate the replenishment side of the loom and the opposite side of the loom I herein designate the replenishment indicating side of the loom. Although the replenishment may be caused to occur either upon complete failure of the filling or upon substantial exhaustion thereof, I have chosen in this embodiment of my invention to represent the same in connection with a bobbin replenishing loom wherein replenishment occurs upon substantial exhaustion of the filling in the running shuttle.

The loom to which the present embodiment of my invention is applied may be provided upon the indicating side thereof with the usual weft fork or detector.

Preferably mounted adjacent to the breast beam of the loom and longitudinally thereof (Figs. 1, 4, 5 and 9) is the transfer shaft 7 of the replenishing mechanism, adapted in this type of the invention to be rocked in any preferred manner to cause replenishment to occur. In the present instance (Fig. 8) the lever 8, operatively connected with the indicating mechanism, is adapted to be pressed outwardly or to the right, viewing said figure, thereby to depress the co-acting slotted end of the lever 9, the opposite end whereof (Fig. 9) is positioned in a longitudinal slot 10 of the lever 11 of the replenishment mechanism, the said lever 11 being pivoted at one end thereof at 12 to the upper end of the lever 13, which is in turn pivoted upon the transfer shaft 7 of the replenishing mechanism so that the said lever 11 may be lifted by the lever 9 into the path of the usual weft hammer 14, whereby in the movement of the same to the left viewing Fig. 9 the shaft 7 of the replenishment mechanism may be rocked and a new bobbin substituted when the filling in the running shuttle is substantially exhausted. Although I have described these parts in detail, it will be understood that the replenishment may be caused to occur in any preferred manner and upon either filling failure or substantial exhaustion of the filling.

In the present embodiment of my invention I have provided means for severing both the old and the new filling upon replenishment and preferably provide separate means for severing said fillings. In this instance of my invention both severing means are illustrated as cutters although I am not restricted thereto. The severing means for the old filling may be suitably mounted upon any desired part of the loom but in the present instance I have shown the same as mounted upon the lay thereof and preferably at the rear thereof and at or near the selvage of the fabric. By the term "selvage" I mean either the selvage of the fabric or the selvage warp ends, being those warp ends which in the completed fabric are located at the selvage. The severing mechanism for the old filling may be operated in any preferred manner but I have here shown the same as operated from the replenishment mechanism, and to that end (Figs. 4 and 5) I have shown the transfer shaft 7 of the replenishment mechanism as provided upon the replenishment side of the loom with the usual transfer lever 15, preferably splined thereon and provided with a set screw 16 permitting longitudinal adjustment. Preferably also splined upon the said transfer shaft 7 is a lever 17, capable of longitudinal adjustment upon the said shaft and adapted to be held in the desired position of adjustment as by a set screw 18. For convenience of description I shall hereinafter designate the said lever 17 as the primary lever for the old filling cutter. The said transfer lever and primary lever extend preferably parallel and toward the lay of the loom and are united at their forward ends by a bolt 19, passed through hubs 20 of the said levers and having one end thereof screw threaded for the reception of a nut 21. Between the hubs 20—20 is mounted a sleeve 22, having preferably formed integral therewith an arm 23, provided if desired with a roller 24, the said arm 23 forming in effect an extension of the lever 17. By the described construction the said levers 15 and 17 are rigidly united. Inasmuch as in the present embodiment of my invention I prefer to mount the old filling cutter at or near the selvage and to aline therewith the operating means therefor, in weaving narrower goods I may shift the primary lever 17 for the old filling cutter longitudinally upon the transfer shaft 7 to aline the same with the new position of the old filling cutter if the same is shifted. To do this the nut 21 is removed and the lever 17 is moved to the desired position of adjustment, preferably leaving the transfer lever 15 in the position shown in Fig. 5. The nut 21 will then be replaced upon the exposed end of the bolt 19 so as to clamp the sleeve 22 against the hub 20 of the primary lever 17.

The severing means for the old filling which in the present embodiment of my invention is represented as having cutting blades, is herein shown at 24 as mounted upon the rear of the lay of the loom and therefore at the rear of the plane of the front face of the reed 25 so that in the operation thereof the same is preferably projected into a position in advance of the front face of the reed, so as to engage the filling that is to be severed. The severing means of whatever type may if desired be so located with respect to the reed that it is projected through the same or past the end thereof in order to encounter and sever the filling. In the present instance (Fig. 3) 1 have shown the said severing means as so mounted that a portion thereof may be projected through the reed 25 and to that end have provided the latter with an opening 26, which may be provided by omitting the desired number of dents thereof. The cutting blades grasp between them the filling and positively cut the same.

As merely a preferred manner of mounting the severing means for the old filling here shown as a cutter, there is in this instance (Figs. 3 and 4) pivotally mounted at 28 upon the lay and preferably at the rear face thereof a cutter carrier 27, here shown as pivoted upon a bracket 29 preferably secured upon the lower face of the lay as by a screw 30 for longitudinal adjustment thereon. Preferably at or near the upper end of the cutter carrier 27 are in this embodiment of my invention provided two cutting blades or jaws 24 which are here shown as substantially parallel and are preferably of spring metal. In the present instance the said blades or jaws are shown as inclined slightly upwardly and inwardly or toward each other. Mounted to coöperate with the said cutting blades or jaws 24 is here provided a lower blade or jaw 32, carried at or near the upper end of a vertical rod or slide 33, the same having preferably a splined or similar connection 34 with the cutter carrier 27 so that the said rod may be moved longitudinally therein and held from twisting movement, and being preferably also provided at its lower end with an enlargement 35.

While I have described specifically two upper blades 24 adapted to coöperate with a lower cutting blade 32, it will be understood that one of said upper blades may be replaced by a suitable guide to hold the remaining upper blade in correct position. While the cutting edges of the blades have been described as inclined it will be understood that any preferred form of cutting blade may be employed.

Upon the upper end of the rod or slide 33 is provided a pin 36, and upon the cutter carrier 27 is a pin 37, to which pins is attached the coiled spring 38, the tendency whereof is to hold the rod or slide 33 in its lowered position and hence to hold the cutter blade 32 in its lower or non-cutting position. Preferably upon the under side of the lay and upon the bracket 29 secured thereto (Figs. 3 and 4) is pivoted at 38' a lever 39, here shown as a cam lever and for convenience of description so designated, although it is to be understood that the said lever need not have a cam thereon and that other operating means may be substituted for the said lever. Preferably mounted in a hub 40 upon the outer end of the said lever 39 is a pin 41 formed with or connected to a sleeve 42, mounted upon the lower end 43 of the slide or rod 33 for sliding movement thereon. Upon the lower threaded end of the extension 43 of the slide or rod 41 are preferably provided the nut 44 and the binding nut 45. Owing to the relative location of the pivot 38' of the cam lever, the pivot 28 of the cutter carrier and the connection between the cam lever and the rod or slide of the cutter blade 32, it will be observed that upon the forward motion of the lay the arm 23 of the primary lever 17 will impinge against the said cam lever 39 somewhat forward or to the left of the point of contact shown in Fig. 4 and will move the said cam lever 39 upwardly upon its pivot, thereby sliding the said sleeve 42 upwardly upon the extension 43 and at the same time swinging the cutter carrier 27 forward upon its pivot 28, thereby to project the jaws of the cutter through the opening of the reed as shown in Fig. 4. The said upward movement of the cam lever 39 brings the sleeve 42 into contact with the enlargement 35 upon the slide or rod 33 and thereupon the blade or jaw 32 is brought into cutting relation with the upper jaw or jaws 24 as shown in Fig. 7. The cam lever 39 is preferably held normally depressed by a suitable spring or in any other desired manner or the weight of the parts may be relied upon to restore them to normal position.

Assuming substantial exhaustion to have been indicated at the side of the loom opposite the replenishing mechanism the transfer shaft 7 will in this embodiment of my invention be rocked and preferably upon the completion of the ensuing forward motion of the lay, the transfer will take place by the ejection of the spent bobbin and the substitution therefor of a filled bobbin. In order to insure a more correct operation of the parts, it is desirable that the filling contained upon the bobbin to be ejected should be severed by the old filling cutter prior to the actual transfer, that is, upon the same forward motion of the lay when the transfer occurs and preferably slightly preceding the actual transfer, so that when such transfer takes place and the old bobbin is ejected the filling thereof will have been already severed and therefore such severed end may be withdrawn by the bobbin from the shuttle and the loom. I am not, however, to be limited to such period of severance of the old filling as it may be severed at any desired time with relation to the proper ejection of the filling carrier, the filling whereon has been exhausted or substantially exhausted. In the present embodiment of my invention the cutter for severing the old filling is so connected as that the severing thereof occurs slightly prior to the actual transfer of the filling carrier.

In the present type of my invention I have chosen to illustrate the same as applied to a loom having thereon (Figs. 1, 4, 6 and 7) an auxiliary filling fork or detector 46, preferably mounted upon the replenishment side of the loom and adapted to feel for the filling and if the same be absent to operate in the usual or any preferred manner to initiate the action of a train of mechanism to perform such function as may be desired therefor, the said filling detector being here shown as pivoted upon a detector slide 46', the rear end whereof is in this embodiment of my invention intended to coöperate with a contacting part to stop the loom. The auxiliary detector may be entirely omitted if desired or it may be located at any preferred part of the loom. Preferably mounted upon the lay of the loom to coact with the auxiliary weft detector is a grid 47. Viewing particularly Figs. 1 and 10, it will be apparent that when the old filling is severed upon a forward movement of the lay no filling is presented to the said auxiliary filling detector if the same be provided, and that therefore, owing to the absence of the filling during this one forward movement of the lay the auxiliary weft fork or detector will not be tilted and that through the weft detector carrier and the weft hammer the loom will be stopped as usual and well understood or such other function effected as the said auxiliary detector is provided to accomplish, unless means be employed to take the place of the said filling upon the described forward movement of the lay to tilt the weft detector in the usual manner. That is to say, if my invention be employed in that type of loom wherein an auxiliary detector is provided I prefer to employ means to neutralize the action thereof to accomplish its function during that movement of the lay upon which no filling would be presented to the said auxiliary detector, owing to the fact that the same has just been severed by the old filling severing device. It will be apparent that in a loom wherein no auxiliary filling detector is provided the provision of such neutralizing means is unnecessary. In order to neutralize the effect of the auxiliary detector, or when a pivoted weft fork is employed, to tilt the same upon its pivot so that the rear end thereof is lifted from engagement with the weft hammer, any suitable mechanical means may be employed. In this type of my invention I provide (Figs. 3, 7 and 10) the cutter carrier 27 with a projecting portion or wire 48, preferably projecting laterally from a face thereof so that when the cutter carrier is moved to bring the blade or blades 24 into effective cutting position, the said projection 48 is so presented to the rear face of the grid 47 if the same be provided as that in the forward movement of the lay the said projection is brought into effective relation with the auxiliary detector thereby to tilt the same upon its pivot, the said projection 48 thus fulfilling the function of the filling upon such described movement of the lay. I have herein selected for illustration and description only one type of mechanical means for tilting the auxiliary weft detector upon such described forward movement of the lay but it is obvious that the same effect may be produced in many different ways and by widely varying mechanisms.

After the transfer of the new bobbin to the running shuttle or of a filled shuttle for the running shuttle, it becomes necessary to sever the new filling which may be done in many different ways. In the present embodiment of my invention I prefer to employ means other than the mechanism whereby the old filling is severed and in the present instance employ a cutter which is here shown as mounted upon the temple upon the replenishing side of the loom. It will, however, be understood that I am not limited or restricted to such location, nor to a severing means of the type herein selected for illustration.

Referring more particularly to Figs. 4, 12 and 13, the temple 49 is mounted upon a temple carrier 50 which is mounted in any suitable manner upon the breast beam of the loom so that the temple may be adjusted toward and from the fell of the cloth. Preferably mounted in a vertical slot or socket 51 in the forward face of the temple 49 and removably held therein by a screw 2, is a blade 53, having as shown a portion of its forward edge sharpened and preferably beveled, the upper end 54 of the blade in this instance of the invention not being sharpened so that upon removal of the blade from its operative position the said portion 50 may be fitted in a handle to be readily sharpened like a knife. It will be obvious, however, that the entire front edge, and, if preferred, both the front and rear edges of the blade may be sharpened. If both edges are sharpened in whole or in part it is obvious that the position of the blade may be reversed when desired. It is apparent that in the operation of the said blade a single portion of the edge thereof is presented to the new filling that is to be severed thereby. When such portion of the edge has become dulled or it is desired to adjust the blade, the screw 52 may be loosened and the blade 53 may be adjusted either up or down but preferably downwardly by tapping upon the upper end thereof. Owing to the described capacity of adjustment of the temple carrier toward and from the fell of the cloth the cutting edge of the blade 49 may be so positioned with respect to the fell thereof as to sever the new filling either as soon as the first pick thereof has been suitably positioned or upon any desired pick thereafter. In Fig. 14 the blade 53 is shown as positioned to sever the new filling after several picks thereof have been laid but it is to be clearly understood that I am not limited to any position of the said blade with respect to the fell of the cloth neither am I limited to any position of the said blade with respect to the selvage, although in the present instance the said blade is shown as substantially contacting therewith, the beveled face of the blade being toward the cloth so that the cutting edge is slightly separated therefrom. It is obvious, however, that the blade may be spaced at any suitable or desired distance from the selvage.

In this embodiment of my invention there is shown in Figs. 11 and 12 a guide 55 to receive the new filling upon the first pick thereof after replenishment, the said guide being so constructed and arranged on the front of the shuttle-box that it will engage the new filling leading from the usual point of attachment to the fell of the cloth, but will not engage the filling leading from the shuttle to the fell of the cloth. When the same is employed the cutter for the new filling is preferably located between the selvage of the fabric and the said guide.

The shuttle detector (Figs. 1 and 6) is indicated at 56. While the same may be of any desired type I have here shown it as mounted so as to travel in a plane inclined to the path of travel of the shuttle when in running position and toward the shuttle when the same is boxed upon the replenishment side, and operate it in any preferred manner.

Although cutters have been devised to sever the old filling that is to be ejected, it not infrequently happens that while the nearly empty bobbin is ejected from the loom, the severed end of such old filling is not withdrawn entirely from the shuttle or the loom by the bobbin, but is clamped between the side or a portion of the bottom of the shuttle and the side of the shuttle box or shuttle binder or the box plate of the shuttle box whereon the shuttle rests and hence will not be withdrawn from the eye of the shuttle. If, therefore, such clamped end of the old filling, being still retained in the shuttle eye, retains an unbroken connection with the remnant of filling left upon the ejected bobbin, when the shuttle is replenished with a filled bobbin and is picked to the opposite side of the loom, there will be drawn into the shed not only the new filling but also the remnant of the old filling or a portion thereof, because the same was not withdrawn from the shuttle eye, although severed, thus forming a double pick. Thus, if the ejected bobbin has considerable filling thereon and this filling be not snapped between the shuttle eye and the ejected bobbin as it is thrown into the cam, then an entire pick of old filling will be drawn into the shed with the new filling to form therewith a double pick, if such old filling be caught between the shuttle and the bottom or side thereof or the shuttle binder. If, however, the old filling be so clamped between the shuttle and some portion of the shuttle box or the binder and be snapped between the shuttle eye and the ejected bobbin in the cam, then a trailing end (an incomplete pick) is drawn into the shed with the pick of the new filling. It will thus be understood that although cutters have been devised to sever the old filling, yet not infrequently such old filling is immediately after, and upon the next pick, again carried into the shed. It has been largely supposed that the carrying of the old filling again into the shed is due to the fact that the cutter failed to operate and that the old filling was not severed, but I have discovered that the true reason is that the end of the filling is as described caught, usually between the shuttle and a shuttle-box wall, and again carried into the shed. In order to prevent this occurrence I have in this type of my invention (Figs. 1, 2, 6 and 11) cut away or recessed a portion 57 of the front wall of the shuttle-box, or of the binder if the same be positioned upon such side of the box, and have also recessed a portion of the box plate or bottom of the shuttle box upon the replenishment side of the loom as indicated at 58. I prefer to so recess the box plate for a distance corresponding substantially to the extent of the contacting portion of the bottom of the shuttle and preferably only along such portion of the plate as the filling is adapted to play upon or contact with during the operation of the parts. It will, of course, be understood that I am not limited to such described location of the recessed portion of the box plate but that to fully carry out the principles of my invention the same may be properly recessed where desired.

Having thus described one type or embodiment of my invention and set forth the principles of operation thereof, I wish it to be understood that although I have described the same specifically and have employed specific terms in designating the parts, yet such terms are used in a broad and general sense and not in their restricted or specific nature and that the scope of the invention is fully set forth in the following claims.

Claims:

1. In a filling replenishing loom, means to sever the old filling, a filling detector to detect the presence or absence of filling, and means, operative when the old filling is severed and consequently not present, to act upon the detector to cause said detector to indicate the presence of filling.

2. In a filling replenishing loom, means to sever the old filling, a filling detector to detect the presence or absence of filling, and means connected to the filling severing means to cause the detector to indicate the presence of filling after it has been severed by the severing means.

3. In a filling replenishing loom, a filling fork on the replenishing side of the loom, old filling severing means at the same side of the loom, and mechanical means to tilt the filling fork when the filling has been severed by the severing means and is not present in front of the fork.

4. A loom comprising weaving instrumentalities, a blade to sever the filling, adjusting means for said blade thereby to present a new cutting edge portion, and adjusting means for said blade to enable the same to cut the filling upon any desired pick.

5. A loom comprising weaving instrumentalities, filling severing means, adjusting means for said severing means thereby to present a new severing edge portion, and adjusting means for said severing means whereby the filling may be severed upon any desired pick.

6. A loom comprising weaving instrumentalities, and recessed provisions to prevent the end of the severed filling from being caught between the bottom of the shuttle and the shuttle box upon replenishment.

7. A loom comprising weaving instrumentalities, old filling severing means, and recessed provisions to prevent binding of the old filling between the bottom of the shuttle and the adjacent wall of the shuttle receiving means upon replenishment.

8. A loom comprising weaving instrumentalities, old filling severing means, and a shuttle receiving means upon the replenishing side of the loom, the portion thereof which receives the bottom of the shuttle being recessed to prevent the binding of the old filling upon replenishment.

9. A loom comprising weaving instrumentalities, old filling severing means, and a shuttle box upon the replenishment side of the loom, the bottom box plate thereof being recessed along the shuttle contacting portion thereof and upon that side of the shuttle whereat the filling is delivered therefrom.

10. A loom comprising weaving instrumentalities, and old filling severing means, the bottom box plate of the shuttle box upon that side whereat replenishment occurs being recessed substantially throughout the length thereof upon that side corresponding to the thread delivery side of the shuttle.

11. A loom comprising weaving instrumentalities, and old filling severing means, the bottom box plate of the shuttle box upon that side whereat replenishment occurs being recessed so that the shuttle does not contact therewith along that side where the severed end of the filling of the ejected bobbin travels.

12. A loom comprising weaving instrumentalities, and means to sever the old filling upon replenishment, a portion of one side and a portion of the bottom of the shuttle box upon the replenishment side being recessed to prevent the binding of the thread.

13. A loom comprising weaving instrumentalities, filling cutting means at the rear of the fell of the cloth to cut the old filling, and means to operate the same to grasp and cut said old filling without displacement thereof from its normal path, and severing means in advance of the fell of the cloth to sever the new filling.

14. A loom comprising weaving instrumentalities including a lay and its reed, filling cutting means carried by the lay to cut the old filling, said cutting means acting independently of the reed in cutting the filling, means horizontally to project said cutting means to cut the old filling, and severing means in advance of the fell of the cloth to sever the new filling.

15. A loom comprising weaving instrumentalities and recessed provisions to prevent the end of the severed filling from being caught between the wall of the shuttle and the shuttle box upon replenishment.

16. A loom comprising weaving instrumentalities, old filling severing means, and means to prevent binding of the old filling between the wall of the shuttle and the adjacent wall of the shuttle receiving means upon replenishment.

17. A loom comprising weaving instrumentalities, old filling severing means and a shuttle receiving means upon the replenishment side of the loom, a portion thereof being recessed to prevent the binding of the old filling upon replenishment.

18. A loom comprising weaving instrumentalities, old filling severing means and a shuttle box upon the replenishment side of the loom, a wall thereof being recessed along the shuttle contacting portion thereof and upon that side of the shuttle whereat the filling is delivered therefrom.

19. A loom comprising weaving instrumentalities, and old filling severing means, a wall of the shuttle box upon that side whereat replenishment occurs being recessed substantially throughout the length thereof upon that side corresponding to the thread delivery side of the shuttle.

20. A loom comprising weaving instrumentalities, old filling severing means, a wall of the shuttle box upon that side whereat replenishment occurs being recessed, so that the shuttle does not contact therewith along that side where the severed end of the filling of the ejected bobbin travels.

21. A loom comprising weaving instrumentalities and means to sever the old filling upon replenishment, a portion of the two meeting walls of the shuttle box upon the replenishment side being recessed to prevent the binding of the thread.

In testimony whereof, I have signed my name to this specification, in the presence of two subscribing witnesses.

FRANCIS ARTHUR MILLS.

Witnesses:
  ROBERT H. KAMMLER,
  EVETETT S. EMERY.